No. 828,805. PATENTED AUG. 14, 1906.
J. G. BIRD.
PICK HOLDER AND CARRIER.
APPLICATION FILED JAN. 18, 1906.
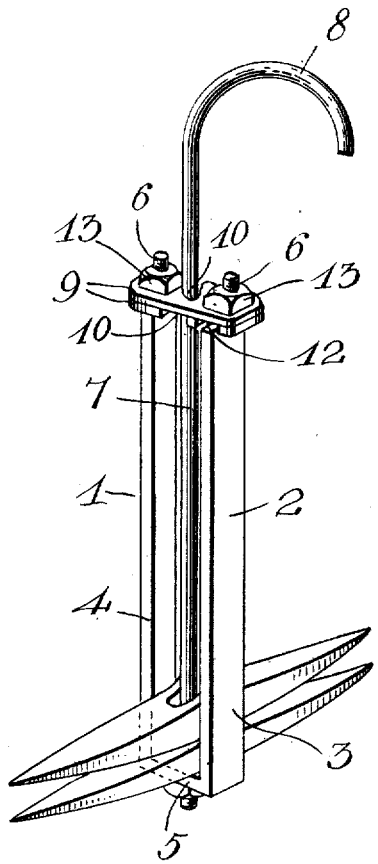
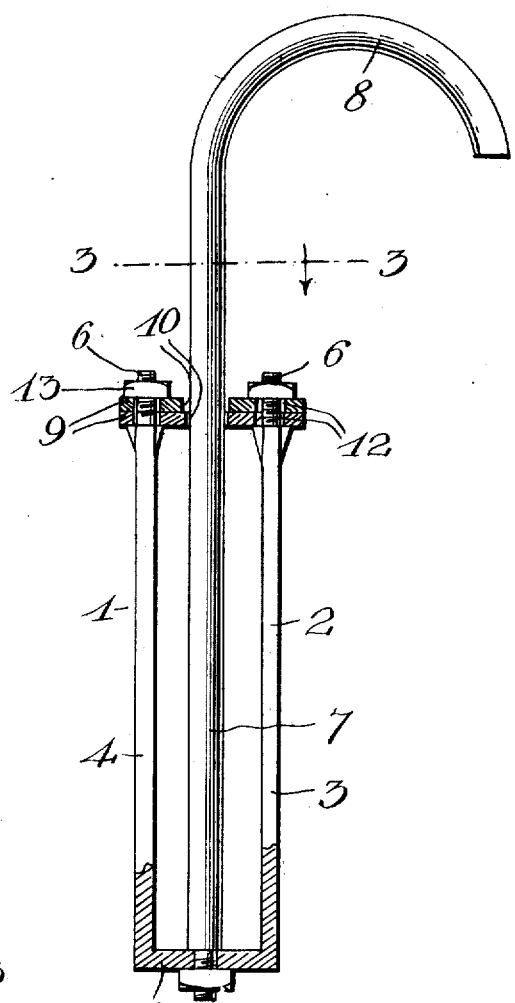
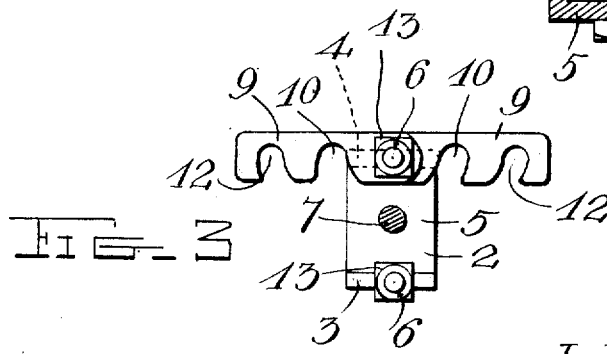
Witnesses
Inventor
John G. Bird
by H. R. Willson
Attorney
THE NORRIS PETERS CO., WASHINGTON, D. C.

UNITED STATES PATENT OFFICE.

JOHN G. BIRD, OF CANTON, ILLINOIS.

PICK HOLDER AND CARRIER.

No. 828,805.     Specification of Letters Patent.     Patented Aug. 14, 1906.

Application filed January 18, 1906. Serial No. 296,697.

*To all whom it may concern:*

Be it known that I, JOHN G. BIRD, a citizen of the United States, residing at Canton, in the county of Fulton and State of Illinois, have invented certain new and useful Improvements in Pick Holders and Carriers; and I do declare the following to be a full, clear, and exact description of the invention, such as will enable others skilled in the art to which it appertains to make and use the same.

This invention relates to improvements in holding and carrying devices for picks.

The object of the invention is to provide a device of this character in which is adapted to be placed a number of pick-heads, whereby said pick-heads will be kept together and may easily be carried from place to place for use.

With the above and other objects in view the invention consists of certain novel features of construction, combination, and arrangement of parts, as will be hereinafter described and claimed.

In the accompanying drawings, Figure 1 is a perspective view of a holder and carrier having arranged therein a number of pick-heads. Fig. 2 is a vertical cross-sectional view of the same; and Fig. 3 is a horizontal sectional view on the line 3 3 of Fig. 3, showing the holding-plates in open position.

Referring more particularly to the drawings, 1 denotes a holder which consists of a bail-shaped frame 2, having side bars 3 and 4, connected at their lower ends by an integrally-formed cross-bar 5. The upper hinged ends of the side bars 3 and 4 are rounded and threaded, as at 6. Secured to the lower cross-bar 5 between the side bars 3 and 4 is a centrally-disposed combined holding and carrying bar 7, the upper end of which is bent or curved into the form of a hook 8, by means of which the device may be carried or suspended from a suitable support.

Pivotally mounted upon the upper rounded end of the side bar 4 are the two upper cross-bars 9, said bars being arranged one above the other, as shown. The bars 9 are provided on their inner edges with alining recesses or notches 10 and 12. When the bars 9 are swung inwardly into engagement with each other, the recesses or notches 10 will engage the central holding and carrying bar 7, while the recesses or notches 12 will engage the reduced upper end of the side bar 3, thus securely bracing and holding said side bars and holding-bar in proper position. Adapted to be screwed upon the threaded upper ends of the side bars 3 and 4 above the bars 9 are nuts 13, by means of which the upper cross-bars 9 are securely held in place.

In placing the pick-heads upon the device the nuts 13 are loosened and the plates 9 swung out of engagement with the holding-bar 7, as shown in Fig. 3 of the drawings, which will permit the pick-heads to be readily slipped onto the holding-rod 7 between the side bars 3 and 4. After the pick-heads have been thus arranged upon the holder the cross-bars 9 are again swung into engagement with the holding-bar 7 and the side bar 2 and the nuts 13 tightened up.

The holder may be constructed in any suitable size, but is preferably sufficiently large to hold twelve pick-heads, which when placed therein will be securely held and may be conveniently carried from one place to another. The hook-shaped extension 7 serves as a handle for carrying the holder and also as a means for suspending the same from any suitable support.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention as defined by the appended claims.

Having thus described my invention, what I claim as new, and desire to secure by Letters Patent, is—

1. A pick holder and carrier comprising a holding-frame, consisting of parallel side bars, a cross-bar connecting the lower ends of said side bars, a centrally-disposed holding-bar fixed in said lower cross-bar, pivotally-mounted cross-bars arranged on the upper ends of said side bars to connect the same and support the upper end of said central holding-bar, means to removably hold said upper cross-bars in place and a supporting and carrying handle arranged on said frame, substantially as described.

2. A pick holder and carrier comprising a holding-frame, consisting of parallel side bars having their upper ends reduced and threaded, an integral cross-bar to connect the lower ends of said side bars, a centrally-disposed combined holding and carrying bar secured at its lower end in said lower crossbar, upper cross-bars pivotally mounted on the reduced upper end of one of said side bars, said upper cross-bars having formed in their inner edges alining recesses adapted to be engaged with said central holding-bar and the reduced upper end of the opposite side bar, nuts adapted to be screwed onto the reduced upper ends of said side bars to hold said upper bars in place, and a curved or hook-shaped extension formed on the upper end of said central holding-bar to form a handle or hanger, substantially as described.

In testimony whereof I hereunto set my hand in presence of two subscribing witnesses.

JOHN G. BIRD.

Witnesses:
G. L. MILLER,
J. L. MURPHY.